United States Patent
Lee (10) Patent No.: US 8,697,272 B2
(45) Date of Patent: Apr. 15, 2014

(54) SECONDARY BATTERY HAVING AN INSULATING MEMBER

(75) Inventor: Dong-Hyun Lee, Suwon-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 682 days.

(21) Appl. No.: 12/706,358

(22) Filed: Feb. 16, 2010

(65) Prior Publication Data

US 2011/0052975 A1  Mar. 3, 2011

Related U.S. Application Data

(60) Provisional application No. 61/239,044, filed on Sep. 1, 2009.

(51) Int. Cl.
  *H01M 2/14* (2006.01)
  *H01M 2/02* (2006.01)

(52) U.S. Cl.
  USPC .......................................... 429/131; 429/177

(58) Field of Classification Search
  USPC .................................. 429/122–347
  See application file for complete search history.

(56) References Cited

U.S. PATENT DOCUMENTS

| | | |
|---|---|---|
| 2006/0024568 A1 | 2/2006 | Lee |
| 2006/0093902 A1 | 5/2006 | Lee |
| 2010/0209750 A1 | 8/2010 | Nagamatsu et al. |

FOREIGN PATENT DOCUMENTS

| | | |
|---|---|---|
| CN | 1728434 A | 2/2006 |
| EP | 0 469 776 A2 | 2/1992 |
| EP | 924780 A1 * | 6/1999 |
| JP | 05-082158 | 4/1993 |
| JP | 7-261678 | 10/1995 |
| JP | 09-199089 | 7/1997 |
| JP | 11-031523 | 2/1999 |
| JP | 11-288703 | 10/1999 |
| JP | 2005-032477 | 2/2005 |
| JP | 2006-040684 | 2/2006 |
| JP | 2006-040899 | 2/2006 |
| JP | 2006-508503 | 3/2006 |
| JP | 2006-093112 | 4/2006 |
| JP | 2006-278245 | 10/2006 |
| JP | 2007-242602 | 9/2007 |
| JP | 2009-48966 A | 3/2009 |
| KR | 1020060010483 A | 2/2006 |
| KR | 1020060106373 A | 10/2006 |

OTHER PUBLICATIONS

European Communication dated Feb. 10, 2011, for corresponding European Patent application 10169597.1.
Extended European Search Report dated Sep. 23, 2010 in corresponding EP application No. 10169597.1.
English machine translation of BE 400376 A, dated Dec. 16, 1933, in the name of LeFranc, 9 pages.

(Continued)

*Primary Examiner* — Jonathan G Leong
(74) *Attorney, Agent, or Firm* — Christie, Parker & Hale, LLP (57) ABSTRACT

A rechargeable battery includes: an electrode assembly including: a positive electrode, a negative electrode and a separator between the positive electrode and the negative electrode that are wound together; a case housing the electrode assembly; a terminal electrically connected to the electrode assembly; and an insulating member installed between the electrode assembly and the case wherein the insulating member has a base and four insulating plates extending from the base.

14 Claims, 8 Drawing Sheets

(56) References Cited

OTHER PUBLICATIONS

KIPO Office Action dated May 24, 2011, for corresponding KR Application No. 10-2010-0014786 (with English translation), 6 pages.

(English Translation) KIPO Final Office Action dated Feb. 23, 2012, for corresponding KR Application No. 10-2010-0014786, 2 pages.

SIPO Office action dated Nov. 1, 2012, for corresponding Chinese Patent application 201010266835.3, with English translation, (20 pages).

Japanese Office action dated Oct. 30, 2012, for corresponding Japanese Patent application 2010-184437, (2 pages).

Patent Abstracts of Japan, and English machine translation of Japanese Publication 11-031523 listed above, (18 pages).

Patent Abstracts of Japan, and English machine translation of Japanese Publication 11-288703 listed above, (7 pages).

Patent Abstracts of Japan, and English machine translation of Japanese Publication 2005-032477 listed above, (20 pages).

Patent Abstracts of Japan, and English machine translation of Japanese Publication 2006-040684 listed above, (8 pages).

Patent Abstracts of Japan, and English machine translation of Japanese Publication 2006-093112 listed above, (20 pages).

Patent Abstracts of Japan, and English machine translation of Japanese Publication 2007-242602 listed above, (27 pages).

* cited by examiner

SECONDARY BATTERY HAVING AN INSULATING MEMBER

CROSS-REFERENCE TO RELATED APPLICATIONS

This application claims priority to and the benefit of U.S. Provisional Application No. 61/239,044, filed on Sep. 1, 2009 in the United States Patent and Trademark Office, the entire content of which is incorporated herein by reference.

BACKGROUND (a) Field

This disclosure relates to a rechargeable battery.

(b) Description of the Related Art

A rechargeable battery can be recharged and discharged, unlike a primary battery that is not intended to be recharged. A rechargeable battery with low capacity is often used for a small portable electronic device such as a mobile phone, a laptop computer, and a camcorder, while a rechargeable battery with large capacity is often used as a power source for driving a motor such as for a hybrid vehicle.

Recently, a rechargeable battery has been developed to have large capacity, high power, and high energy density using a non-aqueous electrolyte. It can be used to drive a device, for example, a motor for an electric vehicle requiring a large amount of electric power.

Further, a rechargeable battery with high power is generally formed with a plurality of rechargeable batteries coupled in series or in parallel. This rechargeable battery may be cylindrical or prismatic.

A prismatic rechargeable battery typically includes an electrode assembly having positive and negative electrodes and a separator therebetween, a case having a space for housing it, a cap plate closing and sealing the case and having a terminal hole through which a terminal is inserted, and a terminal inserted into the case and protruded outside of the case.

The electrode assembly needs to be insulated from the case. However, it is difficult to install an insulating film between the electrode assembly and the case. In addition, the insulation film may be torn apart during the installation process. When torn apart, it may cause an internal short circuit, resulting in more critical problems such as explosion of a rechargeable battery and the like.

In some cases, the electrode assembly is prepared by laminating positive and negative electrodes and a separator therebetween and then, spiral-winding them together, and pressing them into a flat jelly-roll. Accordingly, the electrode assembly may have a dumbbell-shaped cross-section with both edges convex.

However, since the flat part of the electrode assembly is relatively thinner than convex parts at the edges, it may not be stably attached to the interface of a supporting part.

As a rechargeable battery is repetitively charged and discharged, the electrode assembly therein is also repetitively expanded and shrunk. When the electrode assembly irregularly repeats expansion and contraction, it may deteriorate performance of the rechargeable battery.

In addition, the electrode assemblies may have a gap during the expansion. The gap may cause interfaces to be not uniform, resultantly deteriorating performance of a rechargeable battery.

SUMMARY

An exemplary embodiment of the present invention provides a rechargeable battery stably insulating an electrode assembly from a case but still maintaining the shape of the electrode assembly.

According to an embodiment of the present invention, a rechargeable battery includes an insulating member for maintaining the shape of an electrode assembly between the electrode assembly and a case.

In one embodiment of the present invention, the rechargeable battery includes an electrode assembly including: a positive electrode, a negative electrode and a separator between the positive electrode and the negative electrode that are wound together; a case housing the electrode assembly; a terminal electrically connected to the electrode assembly; and an insulating member between the electrode assembly and the case, wherein the insulating member has a base and four insulating plates extending from the base. The base may contact an inner bottom surface of the case.

In some embodiments, the electrode assembly includes a first portion and second portions at respective ends of the first portion, wherein the insulating member has a protruding portion that generally corresponds to the first portion. The protruding portion may have a flat portion between two angled portions. The insulating member may also have a groove between the base and one of the insulating plates wherein the insulating member is folded along the groove. The one of the insulating plates may also have a buffer groove adapted to allow the electrode assembly to expand thereinto. Two of the insulating plates may also be substantially planar and may contact a respective sidewall of the case.

The insulating member may be configured to substantially prevent relative movement between the electrode assembly and the case.

In some embodiments, the rechargeable battery further includes a lead tab electrically connecting the electrode assembly to the terminal mounted on a cap plate sealing the case. In these embodiments, one of the insulating plates may be between the lead tab and the case. The insulating plate between the lead tab and the case may also be substantially flat.

The insulating layer may include laminated sheets of film. The film may include, one or more of, but not limited to, PP (polypropylene), PE (polyethylene), PPS (polyphenyl sulfate), PBT (polybutylene terephthalate), PTFE (polytetrafluoroethylene), PFA (perfluoroalkoxy), FEP (fluorinated ethylene propylene), PVDF (polyvinylidene fluoride), and combinations thereof.

The base may have an arc-shaped surface adapted to receive a rounded edge of the electrode assembly.

The insulating member may generally contact an interior surface of the case.

DESCRIPTION OF REFERENCE NUMERALS INDICATING SOME OF THE ELEMENTS IN THE DRAWINGS

| | |
|---|---|
| 100, 200: rechargeable battery | 14: case |
| 15: electrode assembly | 15a: flat part |
| 15b: convex part | 17: cap plate |
| 21: positive terminal | 22: negative terminal |
| 30, 50: insulating member | 31, 51: base |
| 31a, 51a: first edge | 31b, 51b: second edge |
| 31c, 51c: third edge | 31d, 51d: fourth edge |
| 32, 52: first insulating plate | 34, 54: second insulating plate |
| 36, 56: third insulating plate | 38, 58: fourth insulating plate |
| 32a, 34a, 52a, 54a: supporting part | 35: groove |
| 52b, 54b: buffering groove | 52c, 54c: curved side |

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the specification and drawings, like reference numerals designate like elements.

Figure 1:
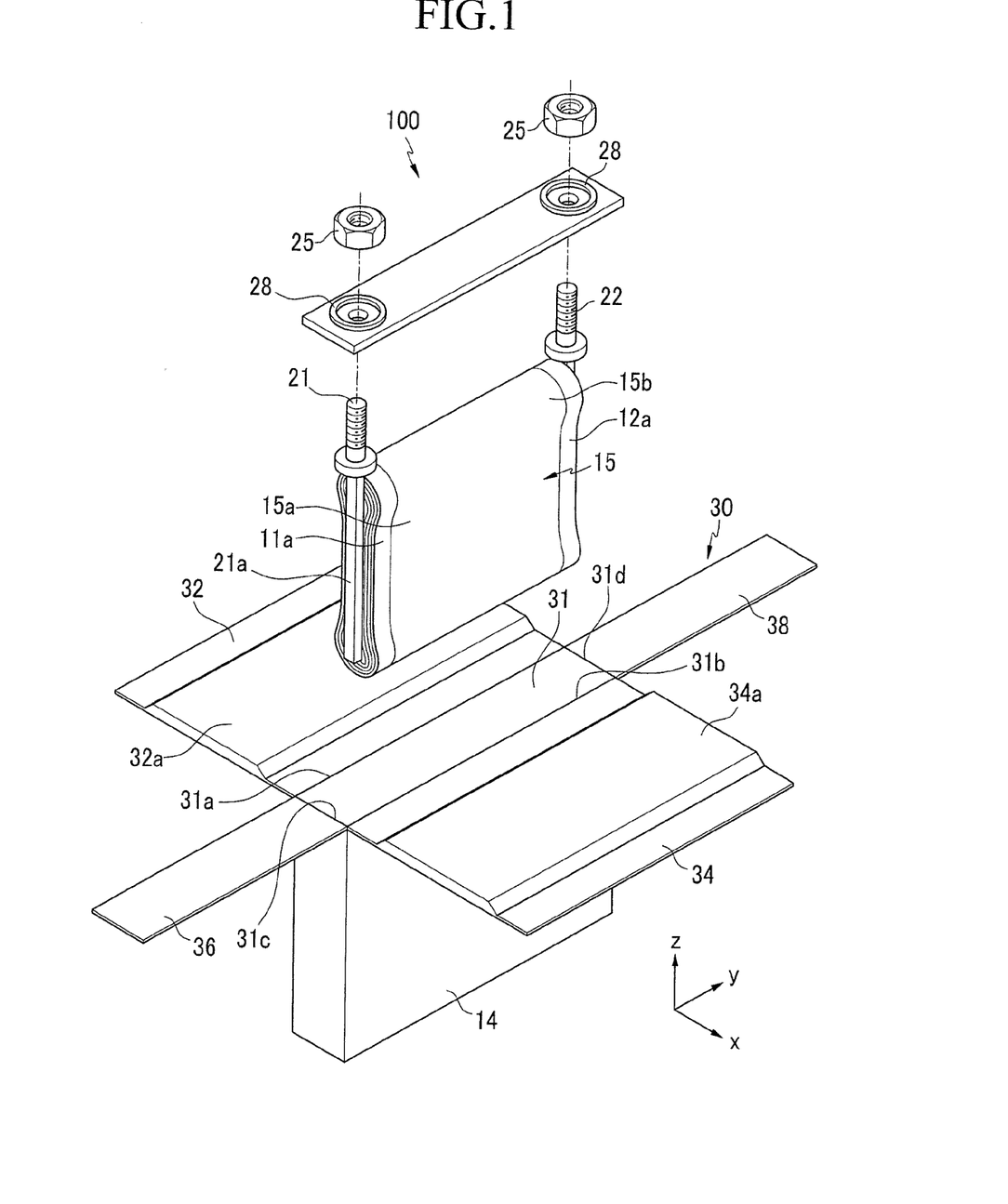
FIG. 1 is an exploded perspective view of a rechargeable battery according to one embodiment of the present invention.

FIG. 1 is an exploded perspective view of a rechargeable battery according to a first exemplary embodiment.

Figure 2:
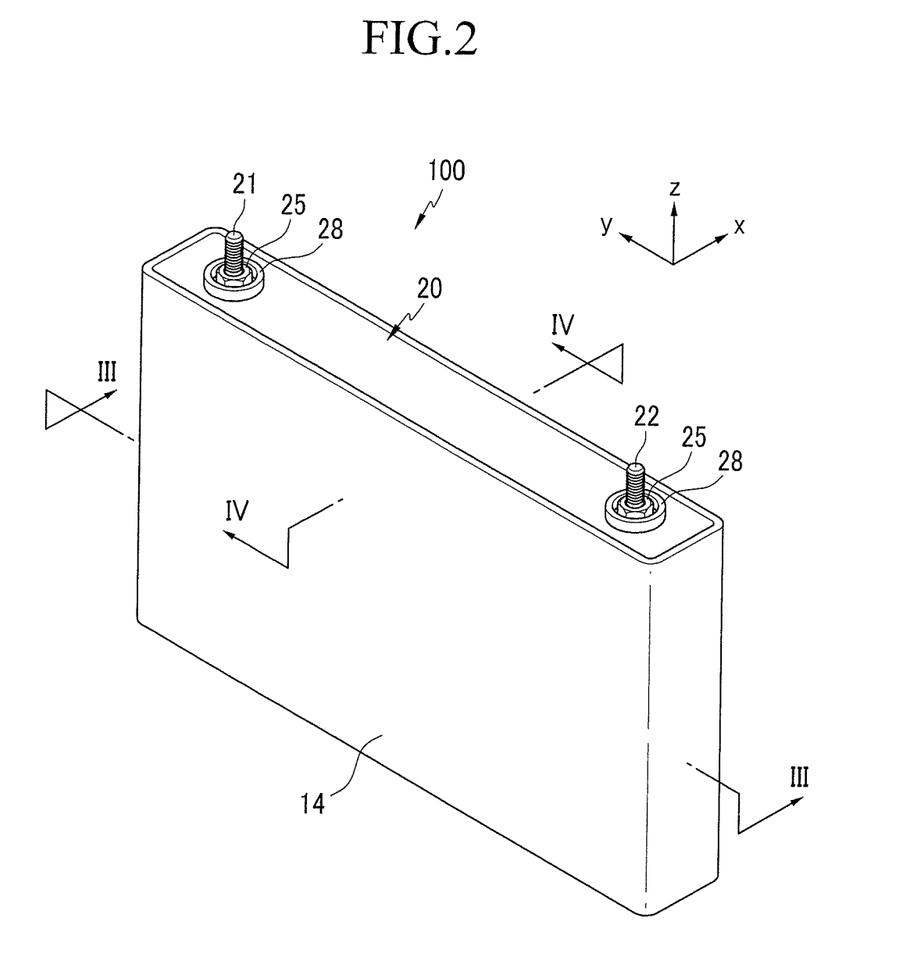
FIG. 2 is a perspective view of an assembled rechargeable battery of FIG. 1.
Figure 3:
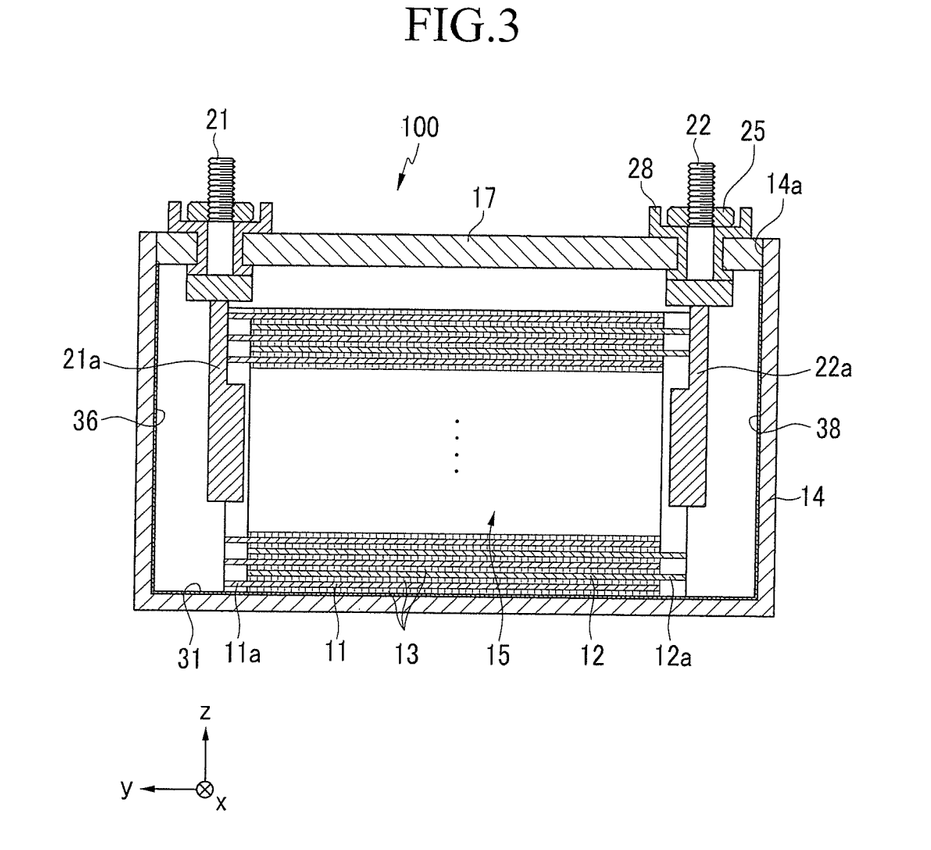
FIG. 3 is a cross-sectional view taken along the III-III line of FIG. 2.
Figure 4:
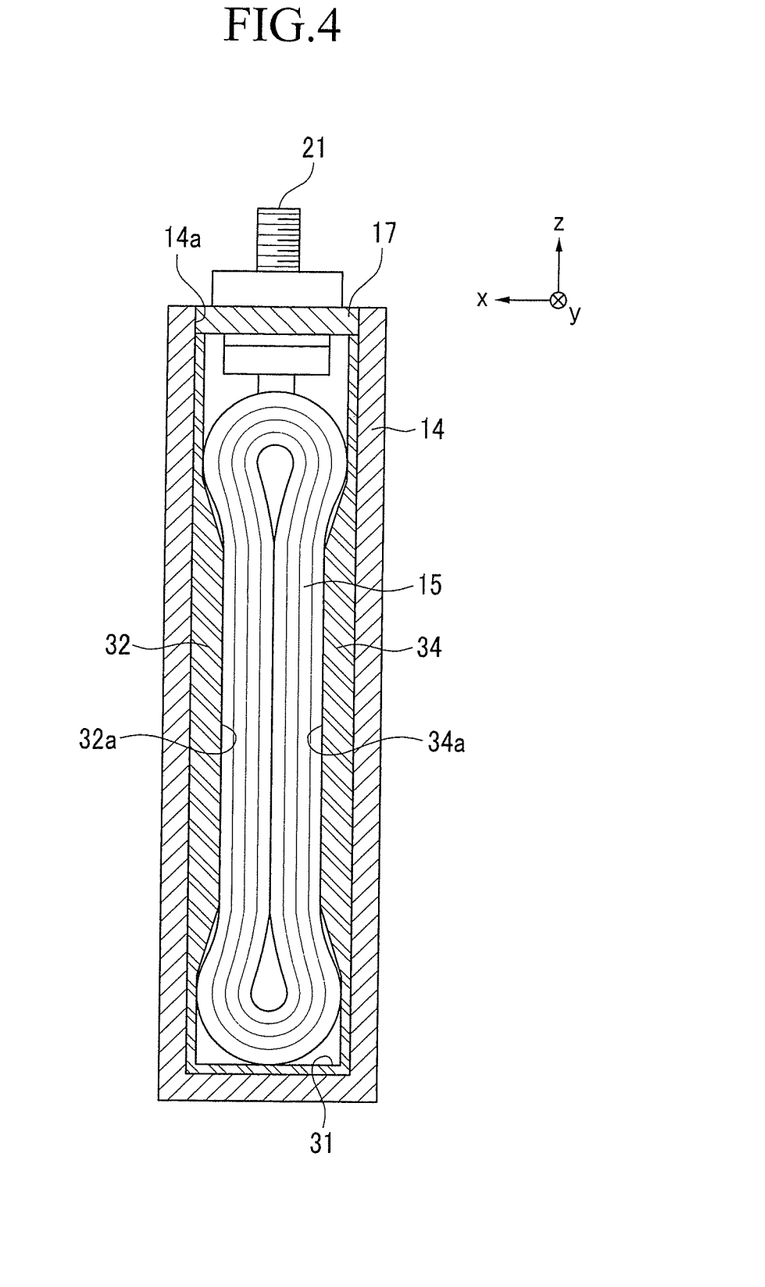
FIG. 4 is a cross-sectional view taken along the IV-IV line of FIG. 2.

FIG. 2 is a perspective view of a rechargeable battery according to the first embodiment, FIG. 3 is a cross-sectional view taken along the III-III line of FIG. 2, and FIG. 4 is a cross-sectional view taken along the IV-IV line of FIG. 2.

Referring to the drawings, the rechargeable battery 100 includes an electrode assembly 15 including a positive electrode 11, a negative electrode 12 and a separator 13 located therebetween, a case 14 having a space for housing the electrode assembly, a cap plate 17 combined with an opening 14a of the case 14, and a positive terminal 21 and a negative terminal 22 mounted on the cap plate 17 and electrically connected to the electrode assembly 15.

The positive electrode 11 and the negative electrode 12 each include a coated region coated with an active material on a current collector made of a thin metal foil plate and include respective uncoated regions 11a and 12a not coated with the active material. The positive uncoated region 11a is formed at one end of the positive electrode 11 along the length direction. The negative uncoated region 12a is formed at the other end of the negative electrode 12 opposite the positive uncoated region 11a along the length direction.

The positive electrode 11 and the negative electrode 12 are laminated with a separator 13 as an insulator in the middle and then spiral-wound into a jelly-roll to form the electrode assembly 15. The electrode assembly 15 is pressed to be flat with a press or the like, so that it can be housed in the case 14. The pressed assembly 15 is pushed toward both edges and swollen to be convex there, forming a convex part 15b. On the other hand, a flat part 15a is formed between the both convex parts 15b.

Referring also to FIGS. 2 to 4, the lead tab 21a of a positive terminal 21 at one edge of an electrode assembly is welded onto a positive uncoated region 11a. The lead tab 22a of a negative terminal 22 is welded onto a negative uncoated region 12a.

The case 14 may be made of a conductive metal such as aluminum, aluminum alloy, nickel-plated steel, or the like and formed as a hexahedronal prism having a space for housing the electrode assembly 15 and an opening 14a at one side.

As shown in FIG. 1, an insulating member 30 is located for electric insulation between the case 14 and the electrode assembly 15. The insulating member 30 has a cross shape and includes a base 31 closely attached to the bottom of a case 14, a first insulating plate 32 extending from a first edge 31a of the base 31, and a second insulating plate 34 extending from a second edge 31b of the base 31. In addition, the insulating member 30 includes a third plate 36 extending from a third edge 31c crossing with the first edge 31a and a fourth insulating plate 38 extending from a fourth edge 31d opposite the third end 31c. Each of the first to fourth insulating plates 32, 34, 36, and 38 contacts a respective side wall of the case 14.

The insulating member 30 may include one or more of, but not limited to, PP (polypropylene), PE (polyethylene), PPS (polyphenyl sulfate), PBT (polybutylene terephthalate), PTFE (polytetrafluoroethylene), PFA (perfluoroalkoxy), FEP (fluorinated ethylene propylene), PVDF (polyvinylidene fluoride), and combinations thereof.

The insulating member 30, as shown in FIG. 1, is positioned on the opening 14a of the case 14 and inserted into the case 14 along with the electrode assembly 15. During insertion, insulating plates 32, 34, 36, and 38 fold toward the electrode assembly 15 to generally envelop the electrode assembly.

In an expanded configuration, the insulating member 30 is an exploded cuboid with the top open, i.e., it is cross-shaped.

As mentioned, the cross-shaped insulating member 30 can be folded and easily mounted between an electrode assembly 15 and a case 14 as the electrode assembly 15 is inserted into the case.

After the electrode assembly 15 is inserted into the case, nuts 25 are threaded on the terminals 21 and 22 and support the electrode assembly 15 from the top. In addition, gaskets 28 are installed for insulation between the nuts 25 and the cap plate 17.

Referring to FIGS. 1 and 4, a supporting part (protruding portion) 32a protrudes from a first insulating plate 32 to generally correspond to and engage the flat part 15a of the electrode assembly 15. In addition, another supporting part (protruding portion) 34a on the second insulating plate 34 is formed to generally correspond to and engage the flat part 15a on the other side of the electrode assembly 15.

The supporting parts 32a and 34a each engage one side of the electrode assembly 15. They have slanted ends so that they can contact substantially the whole surface of the flat part 15a and the convex part 15b right next to the flat part 15a.

In other words, the supporting parts 32a and 34a are flat where they contact with the flat part 15a, and slanted where they contact with a convex part 15b, so that they can stably support the flat part 15a and also stably contact with a part of the convex part 15b. Accordingly, the supporting parts 32a and 34a have a trapezoid-shaped cross-section.

On the other hand, the third insulating plate 36 and the fourth insulating plate 38 are located between lead tabs 21a and 22a and the case 14, preventing the lead tabs 21a and 22a from contacting the case 14. When an insulating member 30 is inserted into a case 14, it is shaped as a cuboid with the top open.

When the rechargeable battery 100 is repetitively charged and discharged, the electrode assembly 15 therein is repetitively expanded and shrunk. As such, the supporting parts 32a and 34a press the flat part 15a of the electrode assembly 15 between the case 14 and the electrode assembly 15, substantially maintaining the shape of the electrode assembly 15 and preventing the interface from being not uniform.

Figure 5:
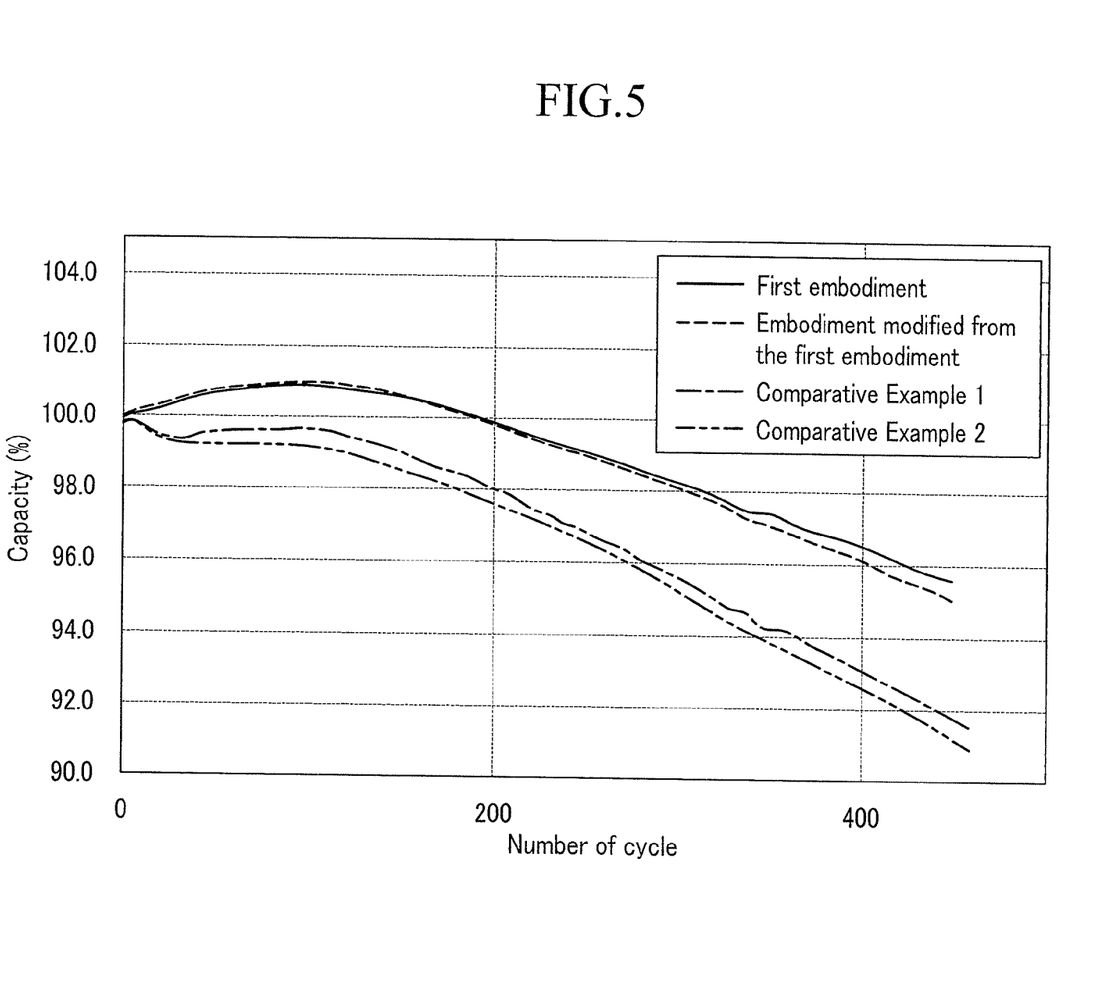
FIG. 5 shows capacity change according to the charge and discharge cycle of rechargeable batteries of embodiments of the present invention and comparative examples.

FIG. 5 is a graph showing capacity change according to charge and discharge cycle of a rechargeable battery according to the first embodiment of the present invention. The rechargeable battery has a regular current of 5 A was charged and discharged from 2.8V to 4.2V with a charge and discharge rate of 1 C.

According to the first embodiment of the present invention, each of the supporting parts 32a and 34a is formed by laminating twenty-four sheets of a film. The supporting parts 32a and 34a can be prepared to have a more precise height through lamination rather than using a single body. According to another embodiment modified from the first embodiment, a supporting part is formed by laminating twelve sheets of a film. Comparative Example 1 has no supporting part. In Comparative Example 2, a rechargeable battery is used having an electrode assembly without a uniform interface.

As shown in FIG. 5, the electrode assemblies having a supporting part show little capacity change after 200 cycles of charges and discharges, but the comparative examples having no supporting part have about 98% capacity. In addition, after 400 cycles of charges and discharges, the electrode assemblies having a supporting part have capacities of about 96%, while the assemblies having no supporting part have capacities of about 93%.

Accordingly, a rechargeable battery including a supporting part according to embodiments of the present invention have a higher capacity retention than a rechargeable battery without a supporting part because the supporting part supports an electrode assembly and maintains a substantially uniform interface. In addition, the supporting part made of 24 sheets of a film had a slightly higher capacity retention than one made of 12 sheets of a film.

FIGS. 6A to 6D show a partial cross-sectional view of an insulating member according to the first embodiment and various modified embodiments of the present invention.

Figure 6A:
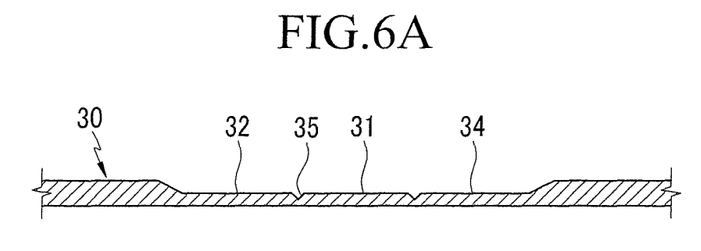
FIGS. 6A, 6B, 6C, and 6D are partial cross-sectional views showing an insulating member according to various embodiments of the present invention.

As shown in FIG. 6A, the insulating member 30 includes a groove 35 on the boundary between a base 31 and supporting plates 32, 34, 36, and 38, so that the supporting plates can be more easily folded. In the first embodiment, the groove 35 is formed to have a triangular cross-section on the top surface of the insulating member 30.

Figure 6B:
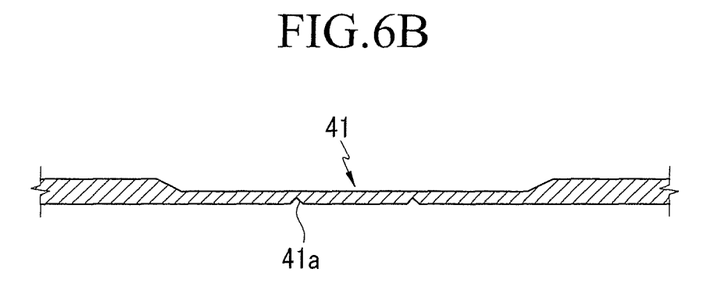
Figure 6C:
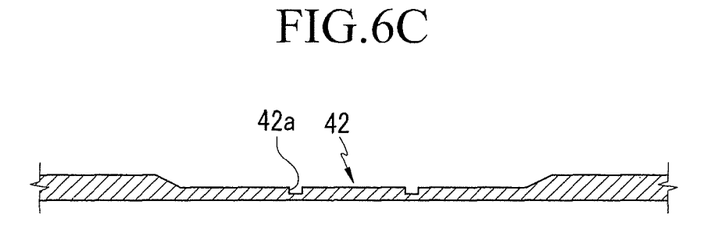
Figure 6D:
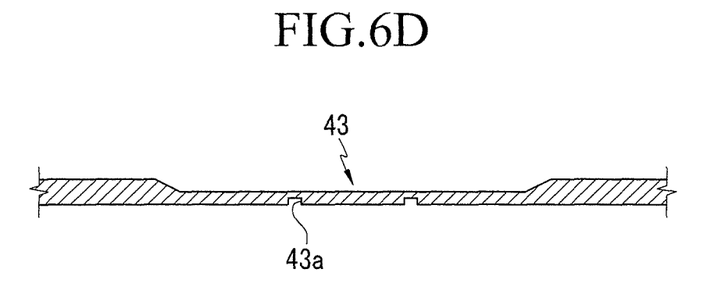

In addition, as shown in FIG. 6B, the insulating member 41 may include a groove 41a having a triangular cross-section on the bottom surface. As shown in FIG. 6C, the insulating member 42 may include a groove 42a having a quadrangular cross-section on the top surface. In addition, as shown in FIG. 6D, the insulating member 43 may include a groove 43a have a quadrangular cross-section on the bottom surface.

Figure 7:
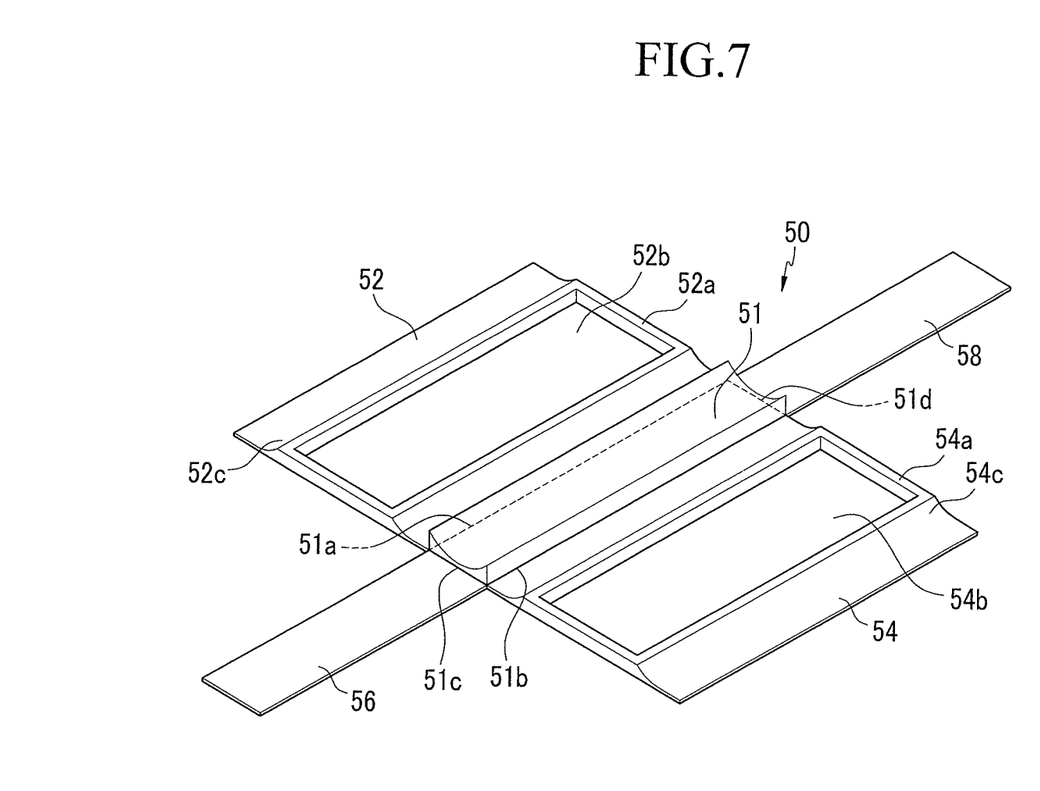
FIG. 7 is a perspective view showing an insulating member according to a second embodiment of the present invention.
Figure 8:
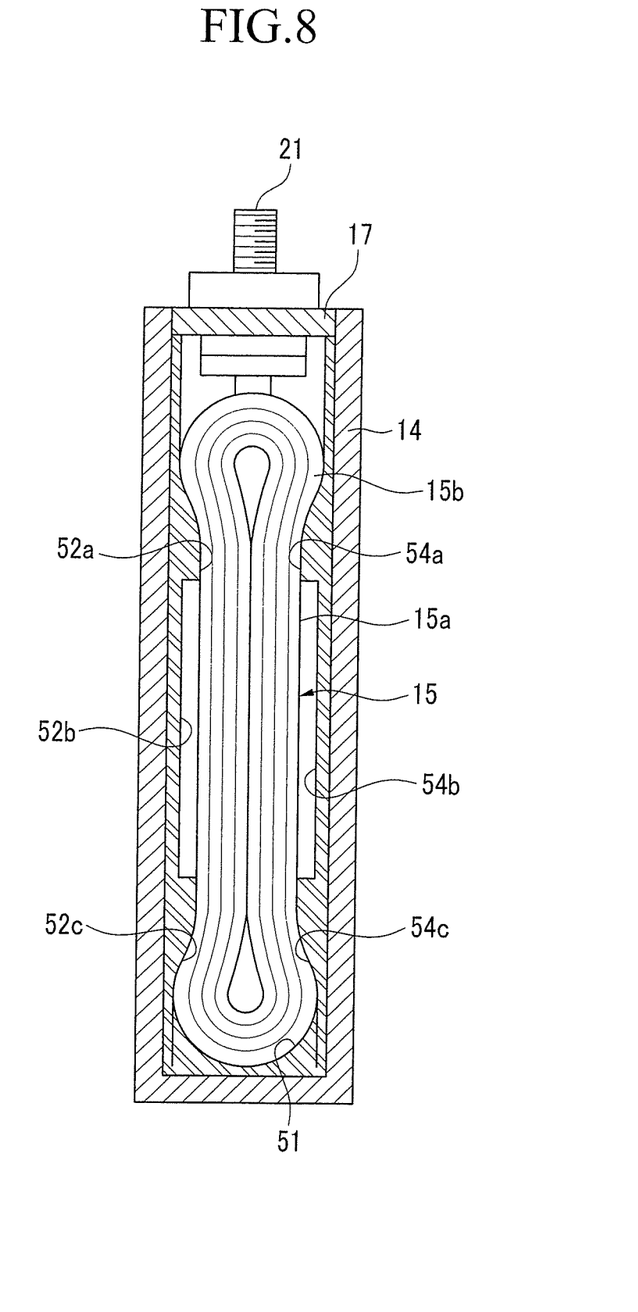
FIG. 8 is a vertically cross-sectional view of a rechargeable battery according to the second embodiment of the present invention.

FIG. 7 is a perspective view showing an insulating member according to a second embodiment of the present invention. FIG. 8 is a vertically cross-sectional view of a rechargeable battery according to the second embodiment of the present invention.

Referring to FIGS. 7 and 8, since a rechargeable battery according to the present embodiment has substantially the same structure as one of the first embodiment except for an insulating member 50, it will not be described or illustrated in more detail.

According to the present embodiment, an insulating member 50 includes a base 51 engaging the bottom of the case 14, a first insulating plate 52 extending from a first edge 51a of the base 51, and a second insulating plate 54 extending from the second edge 51b of the base 51 opposite the first end 51a. In addition, the insulating member 50 may include a third insulating plate 56 extending from a third end 51c crossing with the first end 51a and a fourth insulating plate 58 extending from a fourth end 51d opposite the third end 51c.

The base 51 may be configured to have an arc on the top surface where it engages the electrode assembly 15 so that it can stably support the electrode assembly 15 having a corresponding arc-shaped bottom. Accordingly, the base 51 can stably support the electrode assembly 15 and substantially prevent the electrode assembly 15 from shaking or being significantly dislocated by an external impact. If the electrode assembly 15 shakes or is dislocated, the electrode assembly 15 may have reduced or interrupted contact with terminals 21 and 22. However, when a base 51 has an arc shape on top, the electrode assembly 15 is more stably supported.

The first insulating plate 52 includes a supporting part 52a engaging a flat part 15a and supporting the electrode assembly 15. The supporting part 52a protrudes and includes a quadrangular buffering groove 52b in the center.

The supporting part 52a is flat where it engages the flat part 15a of an electrode assembly, and is generally concave like an arc where it engages the convex part 15b. Since the convex part 15b engages the supporting part 52a at a top and bottom of the flat part, the supporting part 52a may have two concave supporting parts 52c.

The second insulating plate 54 includes a supporting part 54a engaging a flat part 15a of an electrode assembly 15. The supporting part protrudes and includes a buffering groove 54b in the center.

The supporting part 54a is flat where it engages the flat part 15a, and concave like an arc where it engages with the convex part 15b.

When the supporting parts 52c, 54c are concave like an arc according to the embodiment of the present invention, the curved side 54c engages the convex part 15b of the electrode assembly 15. The curved supporting parts 52c and 54c support and pull the electrode assembly at both ends. Accordingly, the curved supporting parts 52c and 54c can prevent the interface of the electrode assembly 15 from becoming non-uniform.

In addition, an electrode assembly 15 expands during charges and discharges of a rechargeable battery, and the resulting compression may cause the electrode assembly to deteriorate and decrease the cycle-life of the rechargeable battery. According to the present embodiment, buffering grooves 52b and 54b are formed in order to stably support the electrode assembly 15 and prevent its degradation.

More specifically, the electrode assembly 15 can enter the buffering grooves 52b and 54b upon expansion, thereby alleviating the pressure thereon.

While embodiments of this invention have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A rechargeable battery comprising:
an electrode assembly comprising a positive electrode, a negative electrode and a separator between the positive electrode and the negative electrode that are wound together;
a case housing the electrode assembly, the case having a top and a bottom, a length of the electrode assembly extending from the bottom of the case toward the top;
a terminal electrically connected to the electrode assembly; and
an insulating member between the electrode assembly and the case,
wherein the insulating member has a base contacting the bottom of the case, and four insulating plates extending from the base along the length of the electrode assembly,
wherein at least one of the insulating plates has a groove adjacent to the electrode assembly and extending along at least a portion of the length of the electrode assembly such that a center portion of an outer surface of the electrode assembly along its length is spaced from a center of an inner surface of the at least one of the insulating plates in a direction perpendicular to the length of the electrode assembly at the groove that is adjacently located to the center portion of the outer surface of the electrode assembly, and wherein an inner wall of the groove is spaced from the outer surface of the electrode assembly.

2. The rechargeable battery of claim 1, wherein the base contacts an inner bottom surface of the case.

3. The rechargeable battery of claim 1, wherein the electrode assembly has a first portion and second portions at respective ends of the first portion, wherein the insulating member has a protruding portion that generally corresponds to the first portion.

4. The rechargeable battery of claim 1, wherein the groove adjacent to the electrode assembly is a buffer groove adapted to allow the electrode assembly to expand thereinto.

5. The rechargeable battery of claim 1, wherein two of the insulating plates are substantially planar.

6. The rechargeable battery of claim 5, wherein each of the insulating plates contacts a respective side wall of the case.

7. The rechargeable battery of claim 1, wherein the insulating member is configured to substantially prevent relative movement between the electrode assembly and the case.

8. The rechargeable battery of claim 1, further comprising a lead tab electrically connecting the electrode assembly to the terminal mounted on a cap plate sealing the case.

9. The rechargeable battery of claim 8, wherein one of the insulating plates is between the lead tab and the case.

10. The rechargeable battery of claim 8, wherein the insulating plate between the lead tab and the case is substantially flat.

11. The rechargeable battery of claim 1, wherein the insulating member comprises laminated sheets of film.

12. The rechargeable battery of claim 11, wherein the film is selected from the group consisting of polypropylene, polyethylene, polyphenyl sulfate, polybuthylene terephthalate, polytetrafluoroethylene, perfluoroalkoxy, fluorinated ethylene propylene, polyvinyllidene fluoride, and combinations thereof.

13. The rechargeable battery of claim 1, wherein the base has an arc-shaped surface adapted to receive a rounded edge of the electrode assembly.

14. The rechargeable battery of claim 1, wherein the insulating member generally contacts an interior surface of the case.

* * * * *

UNITED STATES PATENT AND TRADEMARK OFFICE
CERTIFICATE OF CORRECTION

PATENT NO. : 8,697,272 B2  
APPLICATION NO. : 12/706358  
DATED : April 15, 2014  
INVENTOR(S) : Dong-Hyun Lee Page 1 of 1

It is certified that error appears in the above-identified patent and that said Letters Patent is hereby corrected as shown below:

In the Claims

Col. 8, line 16, Claim 10      Delete "claim 8,",

Insert --claim 9,--

Signed and Sealed this
Twenty-eighth Day of June, 2016

Michelle K. Lee
*Director of the United States Patent and Trademark Office*